Patented Aug. 8, 1939

2,168,981

UNITED STATES PATENT OFFICE 2,168,981

PHENOLIC RESIN MOLDING COMPOSITION

William E. Flood and George B. Howells, Metuchen, N. J., assignors to Catalin Corporation of America, a corporation of Delaware No Drawing. Application August 6, 1936, Serial No. 94,574. Renewed July 26, 1938

11 Claims. (Cl. 260—60)

This invention relates to molding compositions made from condensation products of phenol and formaldehyde. In particular, we are aiming to make light colored base products adapted to be used with dyes to make final products of any desired color, and preferably we are producing such products in such a form that the final molded article will be transparent.

Broadly speaking, our invention is based upon the discovery that products of great value can be made by combining together novolak resins, produced by reacting phenol and formaldehyde in the presence of an acid catalyst, with resinous bodies of types heretofore used for making casting resins, particularly resinous bodies of the types described in Reissue Patent No. 19,708.

In carrying out our invention, the novolak resin is produced by reacting approximately equal molecular proportions of phenol and formaldehyde or preferably slightly less than one mol of formaldehyde with a mol of the phenol and using an acid such as oxalic acid as a catalyst. As is well known in the art, other acids may be used including mineral acid such as hydrochloric acid or other types of organic acid.

In preparing the casting resin, this is made following generally the disclosure of Reissue Patent No. 19,708, with the molecular proportion of formaldehyde substantially in excess of the phenol (more than 1.5:1) and preferably in a proportion of more than 2 mols of formaldehyde for each mol of phenol. The resin is carried to approximately the point where it would ordinarily be poured in the mold. Thereupon the novolak resin is melted and the two resins are combined together with thorough agitation as by the use of a Werner Pfleiderer mixer. We have found it advantageous to use a considerably larger proportion of the novolak resin than the casting type; for example, we have obtained good results using 8 parts of the novolak resin to 3 parts of the casting type. This proportion will vary depending upon the desired characteristics of the finished product and the proportions of free phenol and formaldehyde contained in the respective resins. For example, if the casting resin is low in formaldehyde the ratio might be 8:4 or even 8:5. During the mixing, additional plasticizers may be incorporated, including glycerine and various types of acid materials such as lactic acid, monochloracetic acid or phthalic anhydride. At the same time an additional amount of formaldehyde is introduced into the mass preferably in the polymerized or anhydrous form as paraformaldehyde.

After the mixing is thoroughly complete, the mass is brought to substantial neutrality. For this purpose it is advisable to use an organic base such as triethanolamine, but if transparent bodies are not desired, other types of basic materials may be employed, and even for the production of transparent bodies, other organic bases may be used. It is possible to use hexamethylenetetramine in place of the paraformaldehyde and organic base, but in such case a characteristic yellow or orange color results. This may be due to the evolution of free ammonia even though the quantities added are such as to result in theoretical neutrality.

Upon the addition of the organic base to the warm mix (the temperature must be high enough to keep the mass in liquid form, say for example about 110° C.) there is evidence of further reaction, probably due to the combination of free phenol from the novolak resin with the formaldehyde from the casting resin. Water vapor is evolved and the whole mass tends to froth up and become spongy. At the same time, the condensation reaction continues and the mass hardens. As soon as the mass is stiff the mixer is dumped and the contents are allowed to cool and then are pulverized. The resulting powder can be molded in regular molds and at temperatures and pressures now employed, for example, in molding urea type molding compounds.

If filler is to be employed, it can advantageously be mixed first with the novolak resin and subsequently mixed with other ingredients as above set forth.

This invention can readily be understood from the following example:

4000 grams of phenol were condensed with 2760 grams of formaldehyde and 40 grams of oxalic acid at a temperature of 100° C. The condensed resin begins to separate after about an hour, when the mass becomes cloudy. The boiling is continued for an additional 35 minutes or until a sample of the resin layer put in water at 20° C. remains in one lump and does not stick to the glass. The water layer is then decanted off and the resin washed twice with water. The resin is then dehydrated until a sample in water at 20° C. cracks and is not tacky.

The casting resin was prepared by reacting 1800 grams of phenol with 4575 grams of formaldehyde and 47 grams of KOH as a catalyst. The resin was boiled with a reflux condenser for 40 minutes and at that point 150 grams of lactic acid (calculated on a 100% basis) were added to render the mass slightly acid. The batch was immediately dehydrated with the use of vacuum until it would gel on long-continued heating as indicated by the fact that a sample taken on a metal spatula and immersed in water at a temperature of 12° C. substantially solidified so that it was sufficiently stiff that it could be shattered with a sharp blow. This took about six hours but the time will vary with varying circumstances.

800 parts by weight of the novolak resin and 300 parts by weight of the casting type resin were put in a Werner Pfleiderer mixer and heated to a temperature of 135° C. At the same time, 45 parts of glycerine and about 10 parts of lactic acid were added together with 36 parts by weight of paraformaldehyde. These ingredients were thoroughly mixed together for about half an hour and then 36 parts by weight of triethanolamine were added and stirred in. This brought the mass to substantial neutrality. Almost immediately upon the addition of this basic material there was evidence of a reaction and the mass began to froth up as if boiling. At the same time the resin began to harden so that at the end of about 10 minutes the entire batch had formed a stiff spongy mass which readily fell out of the mixer when the latter was tilted. This spongy mass was then ground to powder and the powder was molded in regular molds such as are used for molding compounds regularly used for commercial production. The resulting molded article took the shape of the mold sharply and had a good finish and was substantially transparent showing only a slight yellowish color. When first taken from the mold and while still hot the product was somewhat soft but quickly hardened on cooling. In other words, if a complex shape is molded, it may be necessary to permit the article to cool on a mandrel or to cool in the mold.

A computation shows that in the preparation of this particular sample there was employed a total of somewhat less than 1.5 mols of formaldehyde for each mol of phenol. It is generally considered that it is essential to use more than 1.5 mols of formaldehyde (say about 1.8 mols of formaldehyde) for each mol of phenol in order to get light stability. Despite this fact, our product showed very little increase of color on exposure to ultra-violet light.

It is to be understood that the example given is only by way of illustration and may be modified in many particulars without departing from the spirit of our invention.

What we claim is:

1. The method of producing molding compounds which comprises reacting more than 1.5 mols of formaldehyde with 1 mol of phenol in the presence of an alkaline catalyst, rendering the mass slightly acid, dehydrating until the mass would gel on long-continued heating, mixing therewith a substantial proportion of melted novolak resin resulting from the reaction of approximately equal molecular proportions of phenol and formaldehyde in the presence of an acid catalyst, substantially neutralizing and permitting the ingredients to react and form a spongy mass, and grinding up such mass to form a molding powder.

2. A process as specified in claim 1, in which more than 2 mols of formaldehyde are employed for each mol of phenol in the reaction conducted in the presence of the alkaline catalyst.

3. A process as specified in claim 1 in which the amount of novolak resin is more than double the amount of the first-specified resin.

4. A method as specified in claim 1, in which the first-specified resin results from the reaction of approximately 3 mols of formaldehyde to 1 mol of phenol and the novolak resin results from the reaction of approximately 0.8 mol of formaldehyde with 1 mol of phenol and about 8 parts by weight of the novolak resin are used for three parts of the first-specified resin.

5. A process as specified in claim 1, in which the mass comprising the mixed resins is substantially neutralized with an organic base.

6. A process as specified in claim 1, in which the mass comprising the mixed resins is substantially neutralized with triethanolamine.

7. A product adapted for molding consisting essentially of the reaction products resulting from reacting together a resin produced by condensing more than 1.5 mols of formaldehyde with 1 mol of phenol in the presence of an alkaline catalyst and subsequently rendering the mass slightly acid and dehydrating until the same would gel on long-continued heating with a resinous mass resulting from the condensation of about equal molecular proportions of phenol and formaldehyde in the presence of an acid catalyst, such two resins being caused to react together in an approximately neutral medium until a hard, spongy mass is obtained.

8. A process of producing a resin composition capable of being molded under heat and pressure into substantially transparent homogeneous products comprising reacting a novolak resin produced by reacting phenol and formaldehyde in the presence of an acid catalyst, with a liquid hydrophilic phenol-formaldehyde resin which has been reacted in the presence of an alkaline catalyst and then slightly acidified, and neutralizing the resulting resin composition to produce a hard spongy mass.

9. A process of producing a resin composition capable of being molded under heat and pressure into substantially transparent homogeneous products comprising reacting a novolak resin produced by reacting phenol and formaldehyde in the presence of an acid catalyst with a liquid hydrophilic phenol-formaldehyde resin which has been reacted in the presence of an alkaline catalyst and then slightly acidified, neutralizing the resulting resin composition with an organic basic compound while heating the composition sufficiently to maintain it in liquid state and causing said resins to react until a hard spongy mass is produced.

10. A process of producing substantially transparent moldable resin products comprising melting a novolak resin produced by reacting phenol and formaldehyde in the presence of an acid catalyst, thoroughly mixing said melted resin with a liquid hydrophilic phenol-formaldehyde resin which has been reacted in the presence of an alkaline catalyst and then slightly acidified, neutralizing the mixed resins with an organic base, which causes further reaction between the resins, permitting said reaction to continue until the combined resins form a hard spongy mass and converting said mass into a transparent moldable powder.

11. A process of producing substantially transparent moldable resin products comprising melting a novolak resin, produced by reacting phenol and formaldehyde in the presence of an acid catalyst, thoroughly mixing approximately eight parts of said melted resin with approximately three to five parts of a liquid phenol-formaldehyde resin which has been reacted in the presence of an alkaline catalyst and then slightly acidified, neutralizing the mixed resins with an organic base, which causes further reaction between the resins, permitting said reaction to continue until the combined resins form a hard spongy mass and converting said mass into a transparent moldable powder.

WILLIAM E. FLOOD.
GEORGE B. HOWELLS.